US 6,552,882 B1

(12) United States Patent
Hayashi

(10) Patent No.: US 6,552,882 B1
(45) Date of Patent: Apr. 22, 2003

(54) INFORMATION REPRODUCTION HEAD APPARATUS AND INFORMATION RECORDING/REPRODUCTION SYSTEM

(75) Inventor: Kazuhiko Hayashi, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/384,434

(22) Filed: Aug. 27, 1999

(30) Foreign Application Priority Data

Sep. 1, 1998 (JP) .............................. 10-247093
Sep. 1, 1998 (JP) .............................. 10-247095

(51) Int. Cl.⁷ ................................................ G11B 5/39
(52) U.S. Cl. .................................... 360/324.2; 360/321
(58) Field of Search .......................... 360/317, 318, 360/318.1, 321, 324, 324.1, 324.11, 324.12, 324.2

(56) References Cited

U.S. PATENT DOCUMENTS

| | | | | |
|---|---|---|---|---|
| 4,803,581 A | * | 2/1989 | Kira et al. ............. | 324/252 |
| 4,949,039 A | | 8/1990 | Gruenberg ............. | 324/252 |
| 5,206,590 A | | 4/1993 | Dieney et al. .......... | 324/252 |
| 5,446,613 A | * | 8/1995 | Rottmayer ............. | 360/319 |
| 5,493,467 A | * | 2/1996 | Cain et al. ............. | 360/120 |
| 5,627,704 A | * | 5/1997 | Lederman et al. ....... | 360/126 |
| 5,636,093 A | * | 6/1997 | Gijs et al. ............. | 257/25 |
| 5,729,410 A | | 3/1998 | Fontana, Jr. et al. ..... | 360/113 |
| 5,828,530 A | * | 10/1998 | Gill et al. ............. | 360/321 |
| 5,862,022 A | | 1/1999 | Noguchi et al | |
| 5,880,911 A | | 3/1999 | Ishihar et al. .......... | 360/113 |
| 5,898,547 A | * | 4/1999 | Fontana et al. ......... | 360/321 |
| 5,898,548 A | * | 4/1999 | Dill et al. ............. | 360/319 |
| 5,909,344 A | * | 6/1999 | Gill ..................... | 360/321 |
| 5,930,087 A | | 7/1999 | Brug et al. | |

FOREIGN PATENT DOCUMENTS

| | | |
|---|---|---|
| JP | 63-71914 A | 4/1988 |
| JP | 2-61572 | 3/1990 |
| JP | 4-103014 | 4/1992 |
| JP | 4-358310 | 12/1992 |
| JP | 2-701748 | 10/1997 |
| JP | 9-282616 | 10/1997 |
| JP | 10-162327 | 6/1998 |
| JP | 10-255231 | 9/1998 |
| JP | 11-316916 | 11/1999 |

OTHER PUBLICATIONS

Sato et al., Ferromagnetic tunneling effect of Co/A10x/NiFe(/FeMn) junctions (1996), pp. 135.

Thompson et al., Thin Film Magnetoresistors in Memory, Storage, and Related Applications, IEEE Transtions on Magnetics, VO.. Mag11, No. 4(07/75), pp. 1039–1050.

ASCII Publilshing Bureau, "Standard MS–DOS Handbook," first edition, ASCII Co. Ltd., Jul. 10, 1984, pp. 223–228, 347–336.

* cited by examiner

Primary Examiner—David L. Ometz
(74) Attorney, Agent, or Firm—Foley & Lardner

(57) ABSTRACT

The present invention provides a yoke-type information reproduction head apparatus 100 having a magnetic sensor block 3 provided on the substrate 1 via a non-magnetic insulation layer 2. The magnetic sensor 3 includes a ferromagnetic tunnel junction element 5 which is sandwiched between an upper electrode block 6 and a lower electrode block 7 and which is connected to a magnetic domain control bias layer 8. This enables to obtain preferable S/N and bit error rate with reduced waveform noise. This invention provides a yoke-type information reproduction head having both of the characteristics of the front yoke 4-1 as a magnetic path and a lower electrode 7 as an electric path.

13 Claims, 13 Drawing Sheets

*FIG. 10*

REPRODUCTION OUTPUT, S/N, MARK LENGTH (FREQUENCY) HALVING THE REPRODUCTION OUTPUT, BIT ERROR RATE, AND REPRODUCTION WAVEFORM OF A HEAD PREPARED WITHOUT USING THE MAGNETIC DOMAIN CONTROL LONGITUDINAL BIAS LAYER

| REPRODUCTION OUTPUT (mV) | S/N (dB) | MARK LENGTH HALVING THE REPRODUCTION OUTPUT (kFCI) | BIT ERROR RATE | REPRODUCTION WAVEFORM |
|---|---|---|---|---|
| 2.9 | 24 | 267 | $1 \times 10^{-4}$ | MUCH NOISE |

FIG. 11

REPRODUCTION OUTPUT, S/N, MARK LENGTH (FREQUENCY) HALVING THE REPRODUCTION OUTPUT, BIT ERROR RATE, AND REPRODUCTION WAVEFORM OF A HEAD (FIG. 3) PREPARED WHILE CHANGING THE MATERIAL OF THE MAGNETIC DOMAIN CONTROL LONGITUDINAL BIAS LAYER

| MATERIAL AND THICKNESS OF MAGNETIC DOMAIN CONTROL LONGITUDINAL (nm) | REPRODUCTION OUTPUT (mV) | S/N (dB) | MARK LENGTH HALVING REPRODUCTION OUTPUT (kFCI) | BIT ERROR RATE | REPRODUCTION WAVEFORM |
|---|---|---|---|---|---|
| CoCrPt (30) | 2.4 | 34 | 202 | $1 \times 10^{-6}$ or less | SATISFACTORY |
| CoCr (30) | 2.3 | 33 | 217 | $1 \times 10^{-6}$ or less | SATISFACTORY |
| CoPt (30) | 2.3 | 33 | 208 | $1 \times 10^{-6}$ or less | SATISFACTORY |
| CoCrTa (30) | 2.4 | 35 | 210 | $1 \times 10^{-6}$ or less | SATISFACTORY |
| FeMn (8) | 2.4 | 34 | 225 | $1 \times 10^{-6}$ or less | SATISFACTORY |
| NiMn (25) | 2.2 | 32 | 226 | $1 \times 10^{-6}$ or less | PREFERABLE |
| Ni oxide (10) | 2.1 | 31 | 227 | $1 \times 10^{-6}$ or less | PREFERABLE |
| NiCo oxide (10) | 2.1 | 30 | 229 | $1 \times 10^{-6}$ or less | SATISFACTORY |
| IrMn (10) | 2.2 | 32 | 230 | $1 \times 10^{-6}$ or less | SATISFACTORY |
| PtPdMn (25) | 2.2 | 33 | 232 | $1 \times 10^{-6}$ or less | PREFERABLE |
| ReMn (20) | 2.2 | 32 | 233 | $1 \times 10^{-6}$ or less | PREFERABLE |

FIG. 12

REPRODUCTION OUTPUT, S/N, MARK LENGTH (FREQUENCY) HALVING THE REPRODUCTION OUTPUT, BIT ERROR RATE, AND REPRODUCTION WAVEFORM OF A HEAD (FIG. 4) PREPARED WHILE CHANGING THE MATERIAL OF THE MAGNETIC DOMAIN CONTROL LONGITUDINAL BIAS LAYER

| MATERIAL AND THICKNESS OF MAGNETIC DOMAIN CONTROL LONGITUDINAL (nm) | REPRODUCTION OUTPUT (mV) | S/N (dB) | MARK LENGTH HALVING REPRODUCTION OUTPUT (kFCI) | BIT ERROR RATE | REPRODUCTION WAVEFORM |
|---|---|---|---|---|---|
| CoCrPt (30) | 2.2 | 32 | 213 | $1 \times 10^{-6}$ or less | SATISFACTORY |
| CoCr (30) | 2.1 | 31 | 219 | $1 \times 10^{-6}$ or less | SATISFACTORY |
| CoPt (30) | 2.1 | 32 | 218 | $1 \times 10^{-6}$ or less | SATISFACTORY |
| CoCrTa (30) | 2.2 | 33 | 215 | $1 \times 10^{-6}$ or less | SATISFACTORY |
| FeMn (8) | 2.2 | 32 | 229 | $1 \times 10^{-6}$ or less | SATISFACTORY |
| NiMn (25) | 2.1 | 31 | 227 | $1 \times 10^{-6}$ or less | SATISFACTORY |
| Ni oxide (10) | 2.0 | 30 | 229 | $1 \times 10^{-6}$ or less | PREFERABLE |
| NiCo oxide (10) | 2.0 | 30 | 233 | $1 \times 10^{-6}$ or less | SATISFACTORY |
| IrMn (10) | 2.1 | 31 | 238 | $1 \times 10^{-6}$ or less | SATISFACTORY |
| PtPdMn (25) | 2.0 | 32 | 237 | $1 \times 10^{-6}$ or less | PREFERABLE |
| ReMn (20) | 2.1 | 31 | 239 | $1 \times 10^{-6}$ or less | PREFERABLE |

FIG.13 REPRODUCTION OUTPUT, S/N, MARK LENGTH (FREQUENCY) HALVING THE REPRODUCTION OUTPUT, BIT ERROR RATE, AND REPRODUCTION WAVEFORM OF A HEAD (FIG. 5) PREPARED WHILE CHANGING THE MATERIAL OF THE MAGNETIC DOMAIN CONTROL LONGITUDINAL BIAS LAYER

| MATERIAL AND THICKNESS OF MAGNETIC DOMAIN CONTROL LONGITUDINAL (nm) | REPRODUCTION OUTPUT (mV) | S/N (dB) | MARK LENGTH HALVING REPRODUCTION OUTPUT (kFCI) | BIT ERROR RATE | REPRODUCTION WAVEFORM |
|---|---|---|---|---|---|
| CoCrPt (8) | 2.1 | 31 | 221 | $1 \times 10^{-6}$ or less | SATISFACTORY |
| CoCr (8) | 2.0 | 29 | 227 | $1 \times 10^{-6}$ or less | SATISFACTORY |
| CoPt (10) | 2.0 | 31 | 229 | $1 \times 10^{-6}$ or less | SATISFACTORY |
| CoCrTa (10) | 2.1 | 31 | 224 | $1 \times 10^{-6}$ or less | SATISFACTORY |
| FeMn (4) | 2.2 | 32 | 238 | $1 \times 10^{-6}$ or less | SATISFACTORY |
| NiMn (10) | 2.0 | 30 | 234 | $1 \times 10^{-6}$ or less | SATISFACTORY |
| Ni oxide (5) | 2.1 | 29 | 231 | $1 \times 10^{-6}$ or less | SATISFACTORY |
| NiCo oxide (5) | 1.9 | 30 | 237 | $1 \times 10^{-6}$ or less | SATISFACTORY |
| IrMn (5) | 2.0 | 29 | 241 | $1 \times 10^{-6}$ or less | SATISFACTORY |
| PtPdMn (10) | 1.9 | 31 | 242 | $1 \times 10^{-6}$ or less | SATISFACTORY |
| ReMn (8) | 2.0 | 29 | 243 | $1 \times 10^{-6}$ or less | SATISFACTORY |

INFORMATION REPRODUCTION HEAD APPARATUS AND INFORMATION RECORDING/REPRODUCTION SYSTEM

BACKGROUND OF THE INVENTION

1. Field of the Invention

The present invention relates to an information reproduction head apparatus for reading an information signal recorded on a magnetic medium and an information recording/reproducing system using the information reproducing head and in particular, to an information reproduction head apparatus and an information recording/reproducing system realizing a small-hysteresis R-H loop and including yoke type magnetoresistance effect sensor using a tunneling magnetoresisstivity (TMR).

The present invention also relates to an information reproduction head apparatus for reading an information signal recorded on a magnetic medium, and to an information recording/reproduction system using the information reproduction head and in particular, to eliminate a positional interference between the front yoke portion and the bottom electrode, so as to enable to obtain the dynamic path of the front yoke portion and the electro-conductive characteristic of the bottom electrode.

2. Description of the Related Art

As a conventional technique, a magnetic read converter called magneto-resistance effect (MR) sensor or head has been disclosed. Here, a data is read from a magnetic surface with a high linear density. The MR sensor detects a magnetic signal through a resistance change as a function of a magnetic flux intensity and direction detected by a read element.

This conventional MR sensor operates according to the anisotropic magnetic resistance (AMR) effect in which one resistance component of the read element changes in proportion to cosine of the angle defined by the magnetization direction and the electric current flowing through the element. The AMR effect is detailed in D. A. Thompson et al "Memory, Storage, and Related Applications", IEEE Trans. on Mag. MAG-11, p. 1039, (1975).

In the magnetic head using the AMR effect is usually subjected to longitudinal bias so as to suppress the Barkhausen noise. This longitudinal bias is applied using FeMn, NiMn, nickel oxide and other antiferromagnetic material.

Furthermore, recently it is described that the more remarkable resistance change of the layered magnetic sensor is caused by an electron spin dependency between magnetic layers sandwiching a non-magnetic layer and accompanying spin-dependent scattering on the boundary surface. This magneto-resistance effect is called "gigantic magneto-resistance effect", "spin valve effect", or the like. Such magneto-resistance sensor is made from an appropriate material and has a higher sensitivity and greater resistance change than the sensor using the AMR effect.

In this type of MR sensor, a pair of ferromagnetic layers isolated by a non-magnetic layer changes in proportion to the cosine of the magnetic direction angle of the magnetization directions of the two ferromagnetic layers.

On the other hand, Japanese Patent Publication A2-61572 discloses a layered magnetic structure which brings a high MR change caused by the non-parallel arrangement of the magnetization of the magnetic layers. The layered structure may be made from a ferromagnetic transient metal or alloy. Moreover, it is disclosed that one of the at least two ferromagnetic layers isolated from each other by an intermediate layer is fixed by a FeMn.

Furthermore, Japanese Patent Publication (unexamined) A4-358310 discloses an MR sensor having two thin film ferromagnetic layers isolated from each other by a non-magnetic metal thin layer. If a magnetic field applied is 0, the magnetization direction of the two ferromagnetic thin film layers intersect vertically and the resistance of the two non-connected ferromagnetic layers changes in proportion to the cosine of the angle defined by the magnetization direction of the two layers, which is independent of the current flowing in the sensor.

Moreover, Japanese Patent Publication (unexamined) A4-103014 discloses a ferromagnetic tunneling magnetoresistivity of a multi ferromagnetic layers inserted by an intermediate layer, in which at least one of the ferromagnetic layers is subjected to a bias magnetic field from an antiferromagnetic body.

Furthermore, Japan Mag. Society, proceeding, 1996, page 135 describes a tunneling magnetoresistivity constituted by a free magnetic layer made from Co and a fixed magnetic layer made from NiFe.

Moreover, Japanese Patent Publication (unexamined) A10-162327 discloses a tunneling magnetoresistivity (TMR) apparatus and magnetoresistance (MR) read head configuration. The TMR apparatus is applied to a so-called shield type magnetoresistance read head, and no description is given on the yoke type information reproduction head having a TMR element with a longitudinal bias layer under a particular condition.

When producing a yoke-type MR sensor using a ferromagnetic TMR junction element, there is a problem that the loop corresponding to the inversion of the free layer of the R-H loop has a high hysterisis and accordingly, when a magnetic information recorded on a magnetic recording medium is reproduced by the sensor, the reproduction waveform has much Barkhausen noise.

SUMMARY OF THE INVENTION

It is therefore an object of the present invention to provide a yoke-type magnetoresistance effect (MR) sensor realizing a small-hysteresis R-H loop and using a tunnel junction element capable of obtaining a preferable reproduction waveform.

Moreover, in a conventional magnetoresistance effect element using a ferromagnetic tunnel junction, among the elements constituting the ferromagnetic tunnel junction, one of the free magnetic layer and the fixed magnetic layer is used an upper electrode and the other is used as a lower electrode.

However, in such an element, the element resistance is affected not only by the tunnel resistance but also electrode resistance of the lower and upper ferromagnetic layers. Accordingly, the resistance change becomes smaller and the current does not flow uniformly in the tunnel junction element.

For this, the free magnetic layer and the fixed magnetic layer cannot be used directly as electrodes but a small-resistance layer should be provided as an upper electrode and a lower electrode.

On the other hand, in the yoke type head, the magnetic flux taken from the medium by the front yoke should be effectively introduced to the free magnetic layer so as to obtain a greater reproduction output.

For this, it is necessary that the yoke end portion and the free magnetic layer end portion be located at close positions.

When using a ferromagnetic tunnel junction element constituted by a free magnetic layer, a non-magnetic layer, a fixed magnetic layer, and fixation layer, the yoke should be provided immediately under the free magnetic layer and partially overlain.

However, the lower electrode also should be located under the ferromagnetic tunnel junction element. Thus, even if designed correctly, positional competition brings about a problem of an element production accuracy. The yoke is overlain with the electrode, which causes various problems of electric characteristics, magnetic characteristics, and head production.

Accordingly, another object of the present invention is to provide a yoke type information reproduction apparatus in which there is no interference between the front yoke and the lower electrode so as to obtain simultaneously a magnetic path of the front yoke and an electric path of the lower electrode, and to provide an information recording/ reproduction system using the yoke type information reproduction apparatus as a second embodiment of the present invention.

The first embodiment employs various basic techniques to achieve the aforementioned object. That is, the information reproduction head according to the first embodiment of the present invention is a yoke type information reproduction head apparatus including a substrate on which a magnetic sensor block is provided via a non-magnetic insulation layer. The magnetic sensor block is connected to a magnetic pole. The magnetic sensor block includes a ferromagnetic tunnel junction element sandwiched by the upper electrode and the lower electrode. The tunnel junction element is connected a bias layer for magnetic domain control.

The second embodiment, in order to achieve the aforementioned object, employs a technical configuration as follows. A magnetic sensor block is mounted on a substrate via a non-magnetic insulation layer and the magnetic sensor block is a connected to a yoke block, constituting a yoke type information reproduction head apparatus, including a front yoke portion provided in a direction where a medium exists with respect to the tunnel junction element and a rear yoke portion in the opposite direction with respect to the tunnel junction element, wherein at least a part of the front yoke portion and at least a part of the lower magnetic pole are located on different surfaces of the tunnel junction element.

BRIEF DESCRIPTION OF THE DRAWINGS

FIG. 10 shows a reproduction output, S/N, mark length (frequency) decreasing the reproduction output by half, a bit error rate, and reproduction waveform of a head prepared without using the magnetic domain control bias layer.

FIG. 11 shows a reproduction output, S/N, mark length (frequency) decreasing the reproduction output by half, a bit error rate, and reproduction waveform of a head (arranged as in FIG. 3) prepared by changing the material of the magnetic domain control bias layer.

FIG. 12 shows a reproduction output, S/N, mark length (frequency) decreasing the reproduction output by half, a bit error rate, and reproduction waveform of a head (arranged as in FIG. 4) prepared by changing the material of the magnetic domain control bias layer.

FIG. 13 shows a reproduction output, S/N, mark length (frequency) decreasing the reproduction output by half, a bit error rate, and reproduction waveform of a head (arranged as in FIG. 5) prepared by changing the material of the magnetic domain control bias layer.

DESCRIPTION OF THE PREFERRED EMBODIMENTS

The information reproduction head apparatus according to the first embodiment is a yoke-type magnetoresistance effect head having a yoke for the magnetoresistance effect element, wherein a tunnel junction element is used for the magnetic sensor block. For example, a rectangular ferromagnetic material or hard magnetic material for the magnetic domain stabilizing element of a free magnetic layer of the tunnel junction element. The shorter side of the magnetic domain stabilizing element is in contact with the tunnel junction element or partially overlain.

In the first embodiment of the present invention, magnetization of the magnetic domain stabilizing element is arranged in one direction. A portion of the free magnetic layer of the magnetoresistance effect element which is in contact with the magnetic domain stabilizing element or is overlain can have a uniform magnetization direction. This suppresses generation of a magnetic domain in the free magnetic layer.

With the aforementioned configuration, the magnetic reverse mode is changed from a magnetic wall movement mode to a magnetic rotation mode, so as to realize an R-H loop of small hysteresis, enabling to obtain a preferable waveform.

The information reproduction head apparatus and the information recording/reproduction system according to the second embodiment employ the aforementioned basic techniques. In the yoke-type magnetoresistance effect head, the magnetic sensor block using a tunnel junction element having, for example, a fixing layer, a fixed magnetic layer, a non-magnetic layer, and a free layer and including an upper electrode block located on the top of the tunnel junction and a lower electrode block located below the tunnel junction in such a manner that at least a portion of the lower electrode and at least a portion of the front yoke are located in the opposing position with respect to the tunnel junction element.

Thus, the electric current can flow uniformly in the tunnel junction element. Since the front yoke and the lower electrode are located not to interfere with each other, it is possible to obtain a characteristic as a magnetic path of the front yoke and the electric path of the lower electrode.

[Embodiment 1]

Description will now be directed to a configuration example of the information reproduction head apparatus and the information recording/reproduction system according to the first embodiment of the present invention with reference to the attached drawings.

Figure 1A:
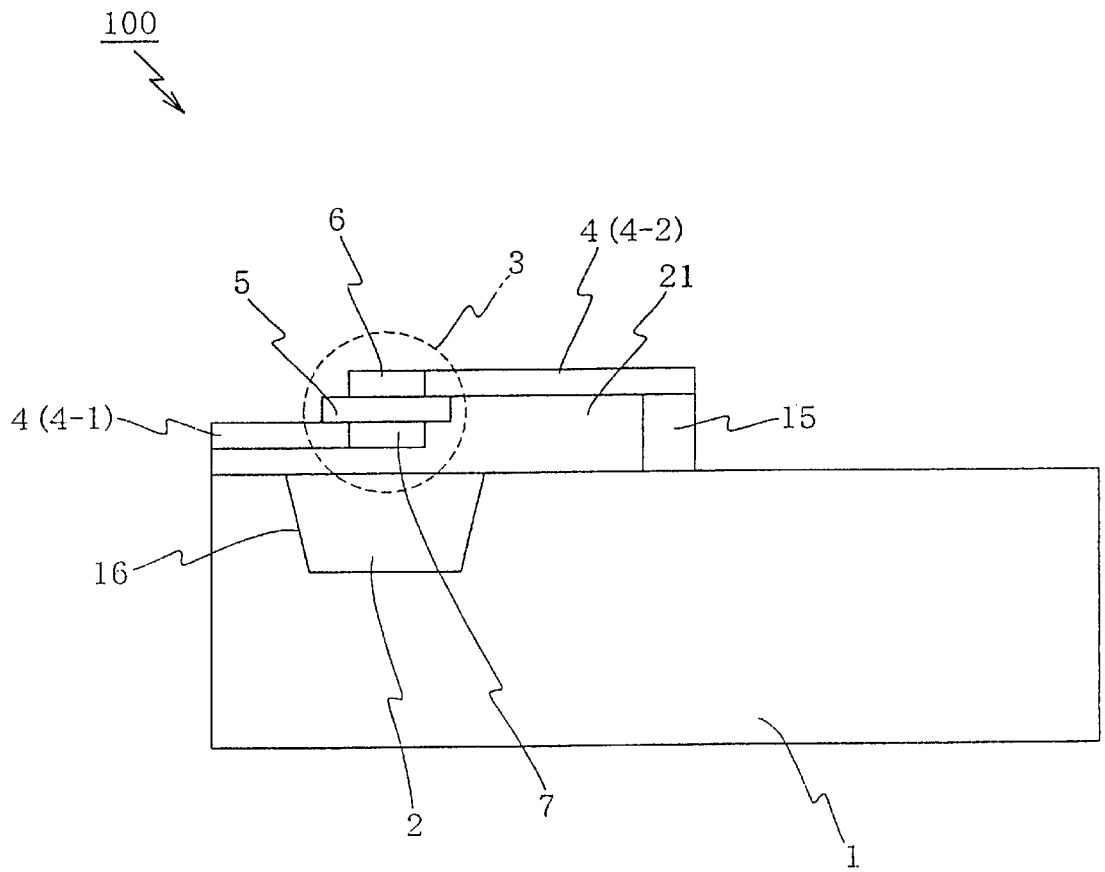
FIG. 1A shows a reproduction head apparatus according to a first embodiment of the present invention.
Figure 1B:
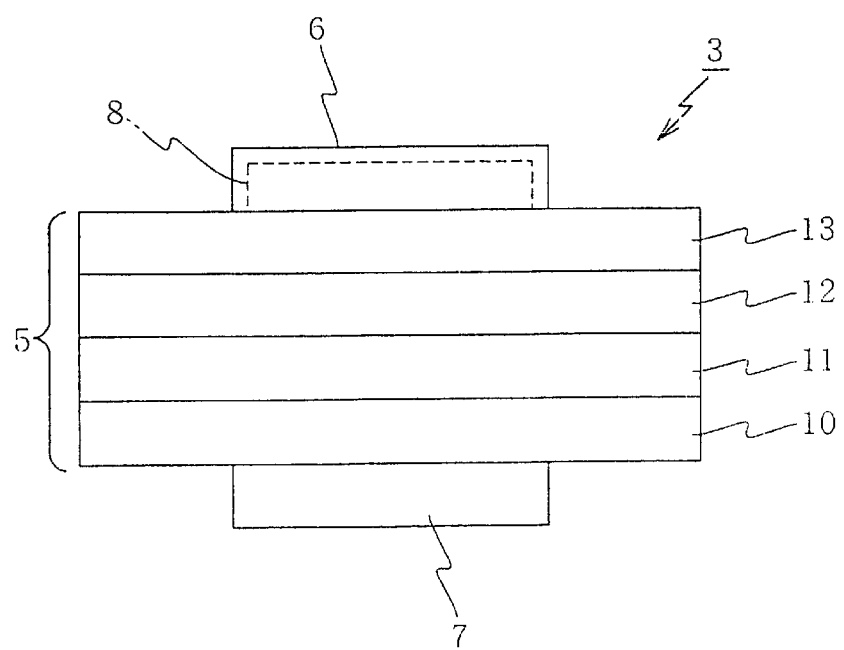
FIG. 1B is an enlarged view of a magnetic sensor used in FIG. 1A.
Figure 2:
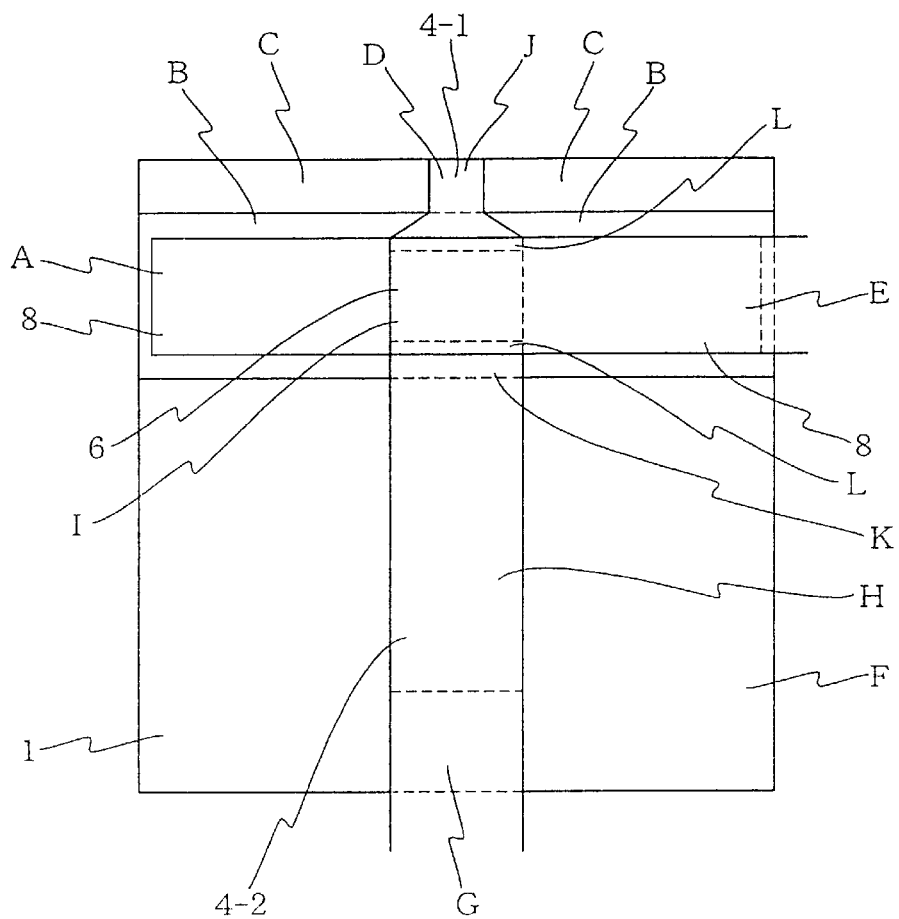
FIG. 2 shows a configuration example of the reproduction head apparatus according to the first embodiment of the present invention.

FIG. 1 shows a cross sectional view and FIG. 2 a plan view of a configuration example of the information reproduction head apparatus according to the present embodiment. This is a yoke type information reproduction head apparatus 100, wherein a magnetic sensor block 3 is provided on a substrate 1 via a non-magnetic insulation layer 2, and the sensor block 3 is connected to a magnetic pole 4. In this yoke type information reproduction head apparatus 100, the magnetic sensor block 3 includes a ferromagnetic tunnel junction element 5 sandwiched by an upper electrode 6 and a lower electrode 7. This tunnel junction element 5 is in contact with the magnetic domain control bias layer 8.

In the information reproduction head apparatus 100 according to the present invention, as shown in FIG. 1B for example, it is preferable that the tunnel junction 5 element include a sensor substrate 10, a fixed magnetic layer 11, a non-magnetic barrier layer 12, and a free magnetic layer 13 which are successively layered in this order. Moreover, in this invention, it is preferable that the bias layer 8 be in contact with the free magnetic layer 13.

In this invention, it is preferable that at least a portion of the bias layer 8 be overlain with a portion of the free magnetic layer. More specifically, the bias layer 8 in plan view has a rectangular shape, and is arranged so that one side of the rectangular layer 8 is in contact with the end of the free magnetic layer 13.

Figure 3:
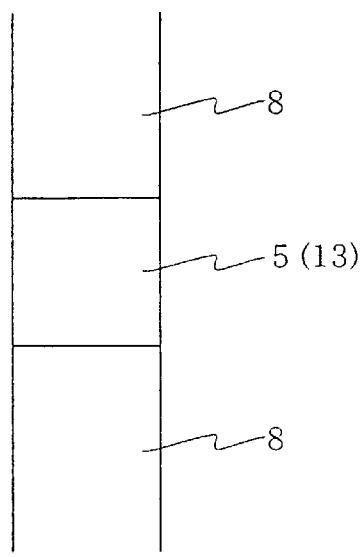
FIG. 3 is a plan view of showing an example of junction state between the tunnel junction element and a bias layer in the reproduction head of the first embodiment.
Figure 4:
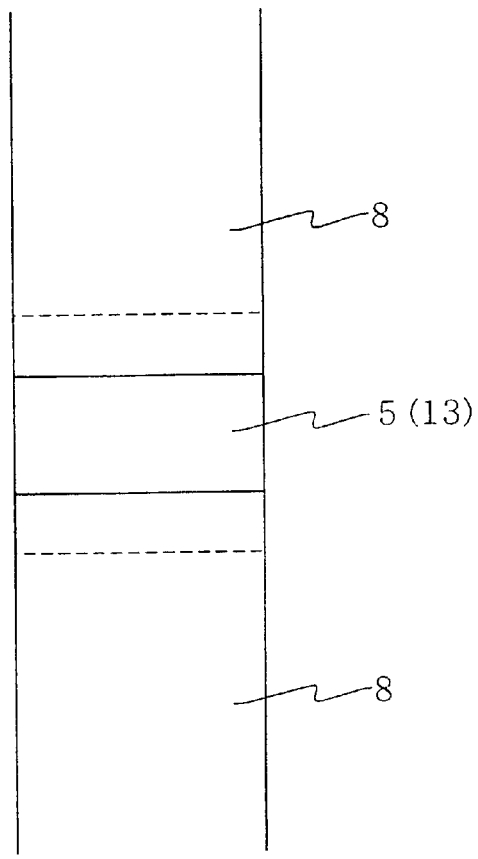
FIG. 4 is a plan view of another example of junction state between the tunnel junction element and the bias layer in the reproduction head of the first embodiment.

That is, FIG. 3 shows a free magnetic layer 13 in the tunnel junction element 5 and the magnetic domain control bias layer 8 in contact at their end portions. FIG. 4 shows the end portions of the free magnetic layer 13 and the magnetic control bias layer 8 overlain.

Figure 5:
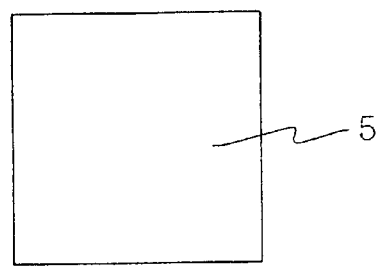
FIG. 5 is a plan view of still another example of junction state between the tunnel junction element and the bias layer in the reproduction head of the first embodiment.

Furthermore, FIG. 5 shows that the entire free magnetic layer 13 is on the magnetic domain control bias layer 8.

On the other hand, according to the present invention, it is preferable that the bias layer 8 be arranged in a direction vertical to the magnetic pole 4. Furthermore, it is preferable that the bias layer 8 be made from a anti-ferromagnetic material or hard magnetic material.

As shown in FIG. 1, in the information reproduction head 16 apparatus 100, a soft magnetic layer 15 is preferably provided for facilitating formation of a magnetic loop. However, this soft magnetic layer may not be provided. Moreover, as shown in FIG. 1A, in the information reproduction head apparatus 100 of the resent invention, the non-magnetic insulation layer 2 is preferably embedded in the substrate 1. It is further preferable that another non-magnetic insulation layer 21 be provided in the space between the substrate surface and the magnetic pole 4 and in the space below the tunnel junction element 5.

Alternatively, it is possible to omit the non-magnetic insulation layer 2, using only the non-magnetic insulation layer 21. The magnetic pole 4 of the present invention is preferably connected at least one of the upper electrode 6 and the lower electrode 5 connected to the tunnel junction element. The magnetic pole 4 may be in abutment with the respective electrodes, or may be partially overlain.

More specifically, the magnetic pole 4 is preferably constituted by a first magnetic pole 4-1 at a position where a medium such as a disc is present and a second magnetic pole 4-2 located at an position with respect to the tunnel junction element 5.

A practical magnetoresitsance detection apparatus or a magnetoresistance detection system can be obtained if the information reproduction head apparatus 100 is added,for example, by means (not depicted) for flowing current through the magnetoresistance sensor 5 made from the tunnel junction element and means (not depicted) for detecting a resistance change of the magnetoresistance sensor as a function of the magnetic field detected.

Figure 6:
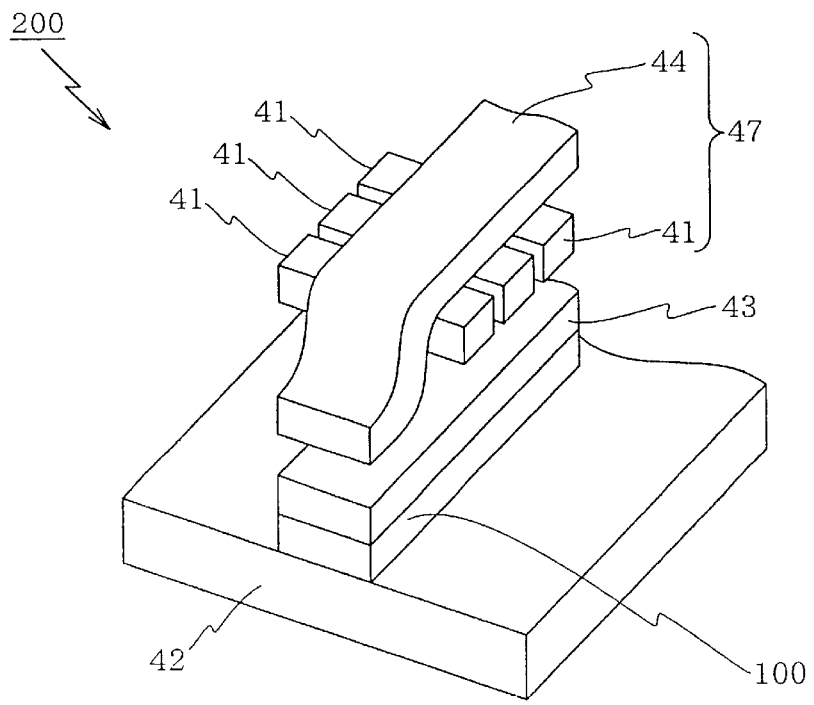
FIG. 6 is a perspective view of a configuration example of the recording/reproduction head used in the information recording/reproduction system according to the present invention.
Figure 7:
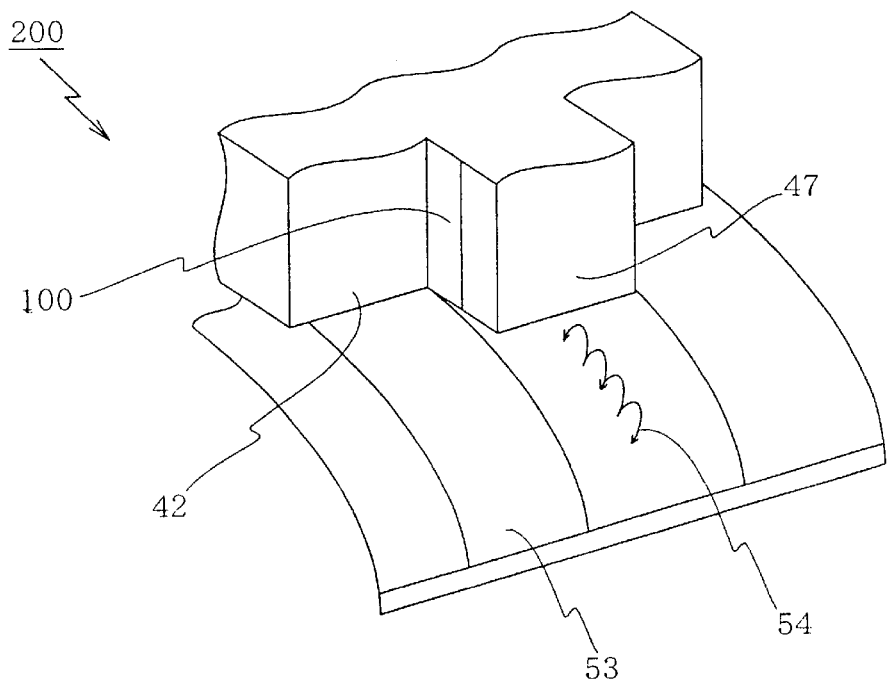
FIG. 7 is an application example of the recording/ reproduction head used in the information recording/ reproduction system according to the present invention.

Description will now be directed to another example of the present invention with reference to FIG. 6 and FIG. 7. An information recording/reproduction system 200 includes: a magnetic recording medium 53 having a plurality of tracks 52 for information recording; a magnetic recording apparatus 47 having a lower magnetic pole 43, a coil 41, and an upper magnetic pole 44 for storing a predetermined information; and the aforementioned information reproduction head apparatus 100 arranged on a substrate 42; and an actuator (not depicted) connected to the magnetic recording apparatus 47 and to the information reproduction head apparatus 100 for moving the magnetic recording apparatus 47 and the information reproduction head 100 to a selected one of tracks of the magnetic recording medium.

Hereinafter, a detailed explanation will be given on the information reproduction head apparatus 100 of the present invention.

That is, FIG. 1 is a cross sectional view and FIG. 2 is a plan view of the information reproduction head apparatus 100 according to the present embodiment. The ferromagnetic substrate 1 is preferably made from NiZn ferrite, MnZn ferrite, MgZn ferrite, or the like. As shown in FIG. 1, the ferromagnetic substrate 1 has a groove 16, which is filled with the non-magnetic insulator 2. If necessary, a non-magnetic insulation layer 21 is formed on this non-magnetic insulator 2 and then the magnetoresistance effect element 5, the upper and the lower electrode layers 6 and 7, and the magnetic poles 4-1 and 4-2 are formed.

FIG. 10 is a plan view of the yoke type information reproduction head apparatus 100 including the ferromagnetic tunnel junction element 6 as follows.

That is, points A to L in FIG. 2 have film configurations as follows.

A. A ferromagnetic substrate, a non-magnetic insulator, a film thickness regulating layer, and a magnetic domain longitudinal bias layer formed in this order.

B. The ferromagnetic substrate and the non-magnetic insulator.

C. The ferromagnetic substrate.

D. The ferromagnetic substrate, the non-magnetic insulator, and a magnetic pole.

E. The ferromagnetic substrate, the non-magnetic insulator, a lower electrode film, and the magnetic domain control longitudinal bias layer.

F. The ferromagnetic substrate.

G. The ferromagnetic substrate, a soft magnetic layer, and a magnetic pole.

H. The ferromagnetic substrate, the non-magnetic insulation layer, the magnetic pole.

I. The ferromagnetic substrate, the non-magnetic insulation layer, the lower electrode film, a ferromagnetic tunnel junction element, and an upper electrode film.

K. The ferromagnetic substrate, the non-magnetic insulator, and a magnetic pole.

L. The ferromagnetic substrate, the non-magnetic insulation layer, the lower electrode film, a ferromagnetic tunnel junction element, and the magnetic pole.

Moreover, the respective film layers are preferably formed using the following materials.

1. Ferromagnetic substrate: NiZn ferrite, Mnzn ferrite, MgZn ferrite.
2. Non-magnetic insulator: Al oxide, Si oxide, aluminum nitride, silicon nitride, diamond-like carbon.
3. Magnetic domain control longitudinal bias layer: CoCrPt, CoCr, CoPt, CoCrTa, FeMn, NiMn, Ni oxide, NiCooxide, IrMn, PtPdMn, ReMn.
4. Magnetic pole and soft magnetic layer: NiFe, CoZr, or CoFeB, CoZrMo, CoZrNb, CoZr, CoZrTa, CoHf, CoTa, CoTaHf, CoNbHf, CoZrNb, CoHfPd, CoTaZrNb, CoZrMoNi alloy, FeAlSi, iron nitride, MnZn ferrite, NiZn ferrite, MgZn ferrite.
5. Lower electrode film and upper electrode film: Au, Cu, Mo, W, Ti.
6. Film thickness regulating layer (layer inserted for adjusting the position of the magnetic poles): Al oxide, si oxide, aluminum nitride, silicon nitride, diamond-like carbon.

As has been described above, the longitudinal bias layer 8 according to the present embodiment may be arranged as shown in FIG. 3 through FIG. 5.

That is, in FIG. 3, the longitudinal bias layer is arranged in contact with the end portion of the ferromagnetic tunnel junction element 5.

In FIG. 4, the longitudinal bias layer is arranged partially overlain on the end portion of the ferromagnetic tunnel junction element. In FIG. 5, the longitudinal bias layer is arranged entirely on the ferromagnetic tunnel junction element.

In the yoke-type magnetoresistance effect information reproduction head apparatus 100 according to the present embodiment, the tunnel junction element used for the magnetic sensor block 3 is as follows. The fixing layer has a function to fix the magnetization direction of the fixed magnetic layer and is contained as a part of the fixed magnetic layer 11.

Moreover, in the tunnel junction element 5 according to the present embodiment, the aforementioned film layers are layered. The arrangement of these layers may be other than that of FIG. 1. For example, a reversed order may be used as will be described later.

(1) substrate, undercoat layer, free magnetic layer, non-magnetic layer, fixed magnetic layer, fixing layer, protection layer (2) substrate, undercoat layer, free magnetic layer, first MR enhance layer, non-magnetic layer, fixed magnetic layer, fixing layer, protection layer (3) substrate, undercoat layer, free magnetic layer, first MR enhance layer, non-magnetic layer, fixed magnetic layer, fixed magnetic layer, fixing layer, protection layer (4) substrate, undercoat layer, free magnetic layer, first MR enhance layer, non-magnetic layer, second MR enhance layer, fixed magnetic layer, fixing layer, protection layer (5) substrate, undercoat layer, fixing layer, fixed magnetic layer, non-magnetic layer, free magnetic layer, protection layer (6) substrate, undercoat layer, fixing layer, fixed magnetic layer, first MR enhance layer, non-magnetic layer, free magnetic layer, protection layer (7) substrate, undercoat layer, fixing layer, fixed magnetic layer, non-magnetic layer, second MR enhance layer, free magnetic layer, protection layer (8) substrate, undercoat layer, fixing layer, fixed magnetic layer, first MR enhance layer, non-magnetic layer, second MR enhance layer, free magnetic layer, protection layer The aforementioned layers are preferably made from the following materials.

(A) The undercoat layer may be a single layered film, mixed film, or multi-film which is preferably made from a metal, oxide, nitride.

More specifically, the undercoat layer (single layered film, mixed film, multi-film) may be made from Ta, Hf, Zr, W, Cr, Ti, Mo, Pt, Ni, Ir, Cu, Ag, Co, Zn, Ru, Rh, Re, Au, Os, Pd, Nb, V or oxides or nitrides of these materials.

Additionally, it is possible to use as an additive element the following: Ta, Hf, Zr, W, Cr, Ti, Mo, Pt, Ni, Ir, Cu, Ag, Co, Zn, Ru, Rh, Re, Au, Os, Pd, Nb, V.

It should be noted that in this embodiment, the undercoat may not be used.

(B) The free magnetic layer may be made from NiFe, CoFe, NiFeCo, FeCo, CoFeB, CoZrMo, CoZrNb, CoZr, CoZrTa, CoHf, CoTa, CoTaHf, CoNbHf, CoZrNb, CoHfPd, CoTaZrNb, CoZrMoNi alloys or amorhpous magnetic material.

(C) The non-magnetic layer may be made from metal, oxide, nitride, or mixture of oxide and nitride, or two-layered film of metal and oxide, two-layered film of metal and nitride, or two-layered film of metal and mixture of oxide and nitride.

For example, Ti, V, Cr, Co, Cu, Zn, Y, Zr, Nb, Mo, Tc, Ru, Rh, Pd, Ag, Hf, Ta, W, Re, Os, Ir, Pt, Au, or oxide or nitride of Si, Al, Ti, Ta as a single substance or mixture, or two-layered film using the aforementioned oxide and nitride as a single substance or mixture made from a single element or an alloy of Ta, Hf, Zr, W, Cr, Ti, Mo, Pt, Ni, Ir, Cu, Ag, Co, Zn, Ru, Rh, Re, Au, Os, Pd, Nb, V, Y.

(D) The first and the second MR enhance layers are preferably formed by using Co, NiFeCo, FeCo and the like, or CoFeB, CoZrMo, CoZrNb, CoZr, CoZrTa, CoHf, CoTa, CoTaHf, CoNbHf, CoZrNb, CoHfPd, CoTaZrNb, CoZrMoNi alloy or amorphous materials.

In the present invention, when the MR enhance layer is not provided, the MR ratio is slightly lowered, but the production steps can be reduced.

(E) The fixed magnetic layer film may be made from a single substance or alloy made from an element selected from a group consisting of Co, Ni, and Fe, and the film may be layered.

(F) The fixing layer may be made from FeMn, NiMn, IrMn, RhMn, PtPdMn, ReMn, PtMn, PtCrMn, CrMn, CrAl, TbCo, Ni oxide, Fe oxide, mixture of Ni oxide and Co oxide, mixture of Ni oxide and Fe oxide, two-layered film made from Ni oxide and Co oxide, two-layered film made from Ni oxide and Fe oxide, CoCr, CoCrPt, CoCrTa, PtCo or the like.

Moreover, most effective candidate of the material is PtMn or PtMn to which one of the following is added: Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, and TA.

(G) The protection layer may be made from metal, oxide, nitride, mixture of oxide and nitride, or two-layered film of metal and oxide, two-layered film of metal and nitride, or two-layered film of metal and mixture of the oxide and nitride. For example, Ti, V, Cr, Co, Cu, Zn, Y, Zr, Nb, Mo, Tc, Ru, Rh, Pd, Ag, Hf, Ta, W, Re, Os, Ir, Pt, Au; or oxide of a group consisting of Si, Al, Ti, and Ta as a single substance or mixture; or a single substance or alloy containing at least one element from a group consisting of Ta, Hf, Zr, W, Cr, Ti, Mo, Pt, Ni, Ir, Cu, Ag, Co, Zn, Ru, Rh, Re, Au, Os, Pd, Nb, V, and Y.

In the present embodiment, the yoke-type element 5 in combination with the write head of an inductive coil can be used as an information recording and reproducing system 200 as a unitary block for recording and reproducing.

FIG. 6 is a perspective view of the information recording and reproducing system 200 employing the recording and reproduction head according to the present invention.

The information recording and reproducing system 200 according to the present embodiment includes the information reproduction head apparatus 100 according to the present invention and a magnetic recording apparatus 47 which is an inductive type recording head. In this example, a longitudinal magnetic recording head is used, but the magnetoresistance effect element 5 according to the present invention can also be used in combination with a vertical magnetic recording head. 26

The magnetic recording apparatus 47 is an information recording head including: a lower magnetic pole 43, a coil 41, and an upper magnetic pole 44. The information reproduction head apparatus 100 and the magnetic recording apparatus 47 are arranged as shown in FIG. 6 and fixed to a base 42. Here, the upper shield film of the information reproduction head 45 may also be used as the lower magnetic pole of the recording head block 47, or the upper shield and the lower magnetic pole may be produced separately. This head writes a signal on the recording medium 53 and reads out a signal from the recording medium 53. As shown in FIG. 6, the sensor portion of the reproduction head and the magnetic gap of the recording head are formed on the same slider and accordingly, it is possible to perform simultaneous positioning on the same rack. This head is processed into a slider and mounted on the information recording and reproducing system including the magnetic recording reproduction apparatus.

FIG. 7 shows a concept of the magnetic recording and reproduction apparatus using the magnetoresistance effect element according to the present embodiment. The reproduction head 100 and the recording head 47 are formed on the substrate 42 serving also as a head slider. This is positioned on the recording medium 53 for performing reproduction. The recording medium 53 is rotated, and the head slider is relatively moved at the height of 0.2 micrometers above the recording medium 53 or in contact with the recording medium 53.

Thus, the information reproduction 100 is arranged at a position at which the magnetic signal recorded in the recording medium 53 can be read from its leak magnetic field 54. Furthermore, the information recording and reproducing system 200 according to the present embodiment preferably includes a know actuator means connected to the magnetic recording apparatus 47 and the information reproduction head apparatus 100, so as to move the magnetic recording apparatus 47 and the information reproducing head apparatus 100 toward a selected track of the magnetic recording medium 53.

Hereinafter, further detailed explanation will be given on the configuration, function, and operation method of the information reproduction head apparatus 100.

We prepared a yoke-type information reproduction head apparatus 100 (conventional example) without using the magnetic control longitudinal bias layer.

The tunnel junction film was prepared by Ta (3 nm), $Pt_{46}Mn_{54}$ (25 nm), $Co_{90}Fe_{10}$ (5 nm), aluminum oxide (2 nm), $Co_{90}Fe_{10}$ (2 nm) $Ni_{82}Fe_{18}$ (8 nm), and Ta (3 nm).

Figure 8:
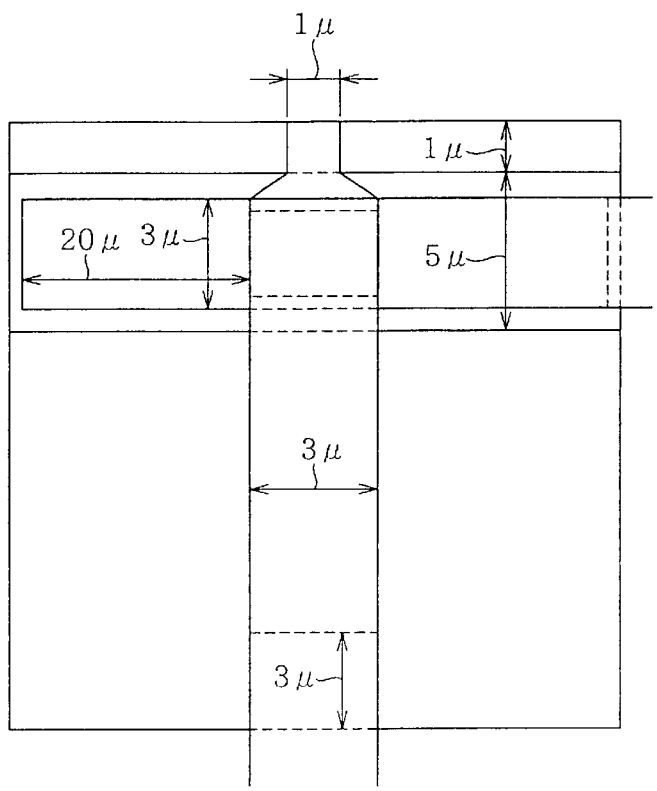
FIG. 8 is an enlarged plan view of a fist example of the information reproduction head apparatus according to the present invention, with dimensions indicated.

After film formation, a thermal treatment was performed for five hours at 250 degrees C. in a direction vertical to the magnetic field of film formation, while applying magnetic field of 500 Oe. The components constituting the reproduction head had dimensions shown in FIG. 8. The ferromagnetic substrate was MnZn ferrite. The magnetic pole was formed by alternately forming a layer of Ta (5 nm) and $Ni_{80}Fe_{20}$ (20 nm) to obtain a total film thickness of 200 nm. The non-magnetic insulator was made from Si oxide. The lower electrode was made from Au (50 nm) sandwiched by Mo (5 nm) The soft magnetic layer was prepared from $Ni_{80}Fe_{20}$. The film thickness regulating layer was made from aluminum oxide.

As shown in FIG. 6, this head was processed into a recording and reproduction unitary head together with a slider and a data was recorded and reproduced to/from a CoCrTa medium. Here, the write track width was 1.5 micrometers, the write gap was 0.2 micrometers, and the read in track width was 1.0 micrometer. When preparing a coil block of the write in head, the photoresist hardening step was performed at temperature 250 degrees C. for two hours.

During this process, the magnetization direction of the fixed magnetic layer which should be directed in the element height direction and the magnetization direction of the fixing layer were rotated and normal operation as the magnetoresistance effect element could not be obtained. For this, after the reproduction head block and the recording head block were prepared, they were subjected to one-hour magnetic thermal processing at 200 degrees C. in the magnetic field of 500 Oe.

Judging from the magnetization curve, this magnetization thermal treatment did not rotate the magnetization direction of the magnetization axis of the free magnetic layer. The coercive force of the medium was set to 2.5 kOe.

The head thus prepared while changing the materials of the magnetic domain longitudinal bias was used to measure a reproduction output, S/N, mark length (frequency) for reducing the reproduction output by half, and a bit error rate (See FIG. 10).

The reproduction output and the mark length reducing the reproduction output by half are as large as 2.9 mV and 267 k, respectively. This results in the S/N as low as 24 dB and the bit error rate was only $1\times10^{-4}$.

Next, the information reproduction head apparatus 100 as the yoke type element shown in FIG. 1 and FIG. 2 was prepared using the arrangement of the longitudinal bias 8 shown in FIG. 3.

The tunnel junction film of the information reproducing head was constituted by Ta (3 nm), $Pt_{46}Mn_{54}$ (25 nm), $Co_{90}Fe_{10}$ (5 nm), Al oxide (2 nm), $Co_{90}Fe10$ (2 nm), $Ni_{82}Fe_{18}$ (8 nm), and Ta (3 nm).

After the film formation, the tunnel junction film was subjected to a 5-hour thermal treatment while applying a magnetic field of 500 Oe in a direction orthogonally intersecting the magnetic field of film formation. The respective components constituting the reproduction head used the dimensions shown in FIG. 8.

The ferromagnetic substrate 1 was made from Mnzn ferrite, the magnetic poles (4-1, 4-2) was mad from alternating the Ta (5 nm) and the $Ni_{80}Fe_{20}$ (20 nm) so as to constitute a total film thickness of 200 nm. The non-magnetic insulator 1 was made from Si oxide. The lower electrode was made from Au (50 nm) sandwiched by Mo (5 nm). The soft magnetic layer 15 was made from $Ni_{80}Fe_{20}$. The film thickness regulating layer was made from Al oxide.

As shown in FIG. 3, the magnetic domain control bias layer 8 is arranged so as to be in contact with the patterned film end. As shown in FIG. 6, this head is processed into the recording/reproducing unitary head with a slider. A data was recorded and reproduced to/from a CoCrTa medium. The write-in track width was set to 1.5 micrometers; the write-in gap was set to 0.2 micrometers; and the read-in track width was 1.0 micrometers.

When preparing a coil block 41 of the write-in head, the photoresist hardening step was performed at temperature 250 degrees C. for two hours.

During this process, the magnetization direction of the fixed magnetic layer which should be directed in the element height direction and the magnetization direction of the fixing layer were rotated and normal operation as the magnetoresistance effect element could not be obtained. For this, after the reproduction head block and the recording head block were prepared, they were subjected to one-hour magnetic thermal processing at 200 degrees C. in the magnetic field of 500 Oe.

Judging from the magnetization curve, this magnetization thermal treatment did not rotate the magnetization direction of the magnetization axis of the free magnetic layer. The coercive force of the medium was set to 2.5 kOe. The head was prepared with different materials of the magnetic domain control bias layer to measure a reproduction output, S/N, mark length (frequency) for reducing the reproduction output by half, and a bit error rate (See FIG. 11).

In comparison to the case (FIG. 10) using no magnetic domain control longitudinal bias layer 8, in both cases (examples), the reproduction output and the mark length reducing the reproduction output by half were lowered. However, the reproduction waveform became a preferable waveform with little Barkhausen noise. This improved the S/N and the bit error rate to be $1\times10^{-6}$.

Next, the information reproduction head apparatus 100 as the yoke type element shown in FIG. 1 and FIG. 2 was prepared using the arrangement of the longitudinal bias 8 shown in FIG. 4.

The tunnel junction film of the information reproducing head was constituted by Ta (3 nm), $Pt_{46}Mn_{54}$ (25 nm), $Co_{90}Fe_{10}$ (5 nm), Al oxide (2 nm), $Co_{90}Fe_{10}$ (2 nm), $Ni_{82}Fe_{18}$ (8 nm), and Ta (3 nm).

After the film formation, the tunnel junction film was subjected to a 5-hour thermal treatment while applying a magnetic field of 500 Oe in a direction orthogonally intersecting the magnetic field of film formation. The respective components constituting the reproduction head used the dimensions shown in FIG. 8.

The ferromagnetic substrate 1 was made from MnZn ferrite, the magnetic poles (4-1, 4-2) was mad from alternating the Ta (5 nm) and the $Ni_{80}Fe_{20}$ (20 nm) so as to constitute a total film thickness of 200 nm. The non-magnetic insulator 2 was made from Si oxide. The lower electrode was made from Au (50 nm) sandwiched by Mo (5 nm). The soft magnetic layer 15 was made from $Ni_{80}Fe_{20}$. The film thickness regulating layer was made from Al oxide.

As shown in FIG. 4, the magnetic domain control bias layer 8 is arranged so as to be partially overlain on the patterned film end. As shown in FIG. 6, This head is processed into the recording/reproducing unitary head 200 with a slider. A data was recorded and reproduced to/from a CoCrTa medium. The write-in track width was set to 1.5 micrometers; the write-in gap was set to 0.2 micrometers; and the read-in track width was 1.0 micrometers.

When preparing a coil block 41 of the write in head, the photoresist hardening step was performed at temperature 250 degrees C. for two hours.

During this process, the magnetization direction of the fixed magnetic layer which should be directed in the element height direction and the magnetization direction of the fixing layer were rotated and normal operation as the magnetoresistance effect element could not be obtained. For this, after the reproduction head block and the recording head block were prepared, they were subjected to one-hour magnetic thermal processing at 200 degrees C. in the magnetic field of 5000 e.

Judging from the magnetization curve, this magnetization thermal treatment did not rotate the magnetization direction of the magnetization axis of the free magnetic layer. The coercive force of the medium was set to 2.5 kOe. The magnetic domain control longitudinal bias layer was made from different materials, and the head was measured in reproduction output, S/N, mark length (frequency) reducing the reproduction output by half, and the bit error rate (FIG. 12).

In comparison to the case (FIG. 10) using no magnetic domain control longitudinal bias layer 8, in respective cases (examples), the reproduction output and the mark length reducing the reproduction output by half were lowered. However, the reproduction waveform became a preferable waveform with little Barkhausen noise. This improved the S/N and the bit error rate to be $1\times10^{-6}$.

Furthermore, using the configuration of FIG. 5 was used to prepare the yoke type element 100 as shown in FIG. 1 and FIG. 2.

The tunnel junction film of the information reproducing head was constituted by Ta (3 nm), $Pt_{46}Mn_{54}$ (25 nm), $Co_{90}Fe_{10}$ (5 nm), Al oxide (2 nm), $Co_{90}Fe_{10}$ (2 nm), $Ni_{82}Fe_{18}$ (8 nm), and Ta (3 nm).

After the film formation, the tunnel junction film was subjected to a 5-hour thermal treatment while applying a magnetic field of 500 Oe in a direction orthogonally intersecting the magnetic field of film formation.

Figure 9:
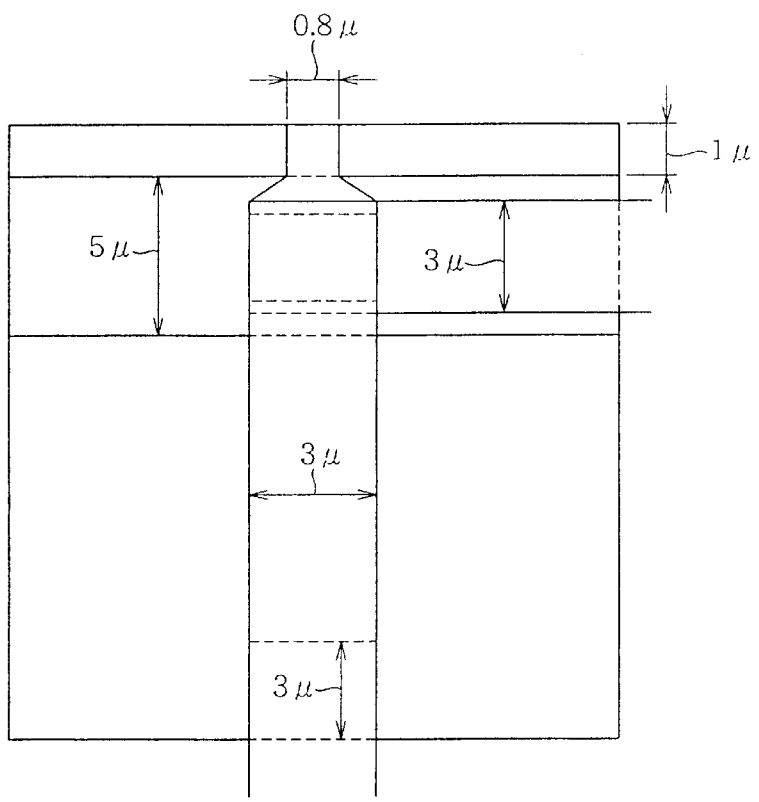
FIG. 9 is an enlarged plan view of a second example of the information reproduction head apparatus according to the present invention, with dimensions indicated.

The respective components constituting the reproduction head used the dimensions shown in FIG. 9.

The ferromagnetic substrate 1 was made from MnZn ferrite, the magnetic poles was made from alternating the Ta (5 nm) and the $Ni_{80}Fe_{20}$ (20 nm) so as to constitute a total film thickness of 200 nm. The non-magnetic insulator 1 was made from Si oxide. The lower electrode was made from Au (50 nm) sandwiched by Mo (5 nm). The soft magnetic layer 15 was made from $Ni_{80}Fe_{20}$. The film thickness regulating layer was made from Al oxide.

As shown in FIG. 5, the magnetic domain control bias layer 8 was arranged so as to be totally overlain on the patterned film end. As shown in FIG. 6, This head is processed into the recording/reproducing unitary head 200 with a slider. Here, the write-in track width was set to 1.5 micrometers, write-in gap was set to 0.2 micrometers, and the read-in track width was set to 0.8 micrometers.

When preparing a coil block 41 of the write in head block 47, the photoresist hardening step was performed at temperature 250 degrees C. for two hours.

During this process, the magnetization direction of the fixed magnetic layer which should be directed in the element height direction and the magnetization direction of the fixing layer were rotated and normal operation as the magnetoresistance effect element could not be obtained. For this, after the reproduction head block and the recording head block were prepared, they were subjected to one-hour magnetic thermal treatment at 200 degrees C. in the magnetic field of 500 Oe.

Judging from the magnetization curve, this magnetization thermal treatment did not rotate the magnetization direction of the magnetization axis of the free magnetic layer. The coercive force of the medium was set to 2.5 kOe. The magnetic domain control longitudinal bias layer was made from different materials, and the head was measured in reproduction output, S/N, mark length (frequency) reducing the reproduction output by half, and the bit error rate (FIG. 13).

In comparison to the case (FIG. 10) using no magnetic domain control longitudinal bias layer 8, in respective cases (examples) the reproduction output and the mark length reducing the reproduction output by half were lowered. However, the reproduction waveform became a preferable waveform with little Barkhausen noise. This improved the S/N and the bit error rate to be $1\times10^{-6}$ below.

Description will now be directed to a magnetic disc apparatus as a specific example of the information recording and reproducing system 200.

For example, the magnetic disc apparatus includes three magnetic discs mounted on a base (not depicted). The back surface of the base has a head drive circuit and signal processing circuit as well as I/O interface. Here, a 32-bit bus line is used for external connection. There are arranged six heads for both sides of the optical discs. A rotary actuator for driving the heads, a drive and control circuit, a directly connected spindle motor for disc rotation are mounted on the magnetic disc apparatus 200. The disc diameter is, for example, 46 mm, and the data surface is from 10 to 40 mm.

The apparatus uses an embedded servo system having no servo surface. This enables to obtain a high density.

This apparatus can be directly connected as an external storage apparatus of a small-size computer. The I/O interface includes a cache memory and can be connected by a bus line having a transfer rate of 5 to 20 mega bytes per second. Moreover, by using an external controller, a plurality of the present apparatus can be connected so as to constitute a large capacity magnetic disc apparatus.

[Embodiment 2]

Hereinafter, a detailed explanation will be given on the information reproduction head apparatus and the information recording/reproducing system according to the second embodiment of the present invention with reference to the attached drawings.

Figure 14A:
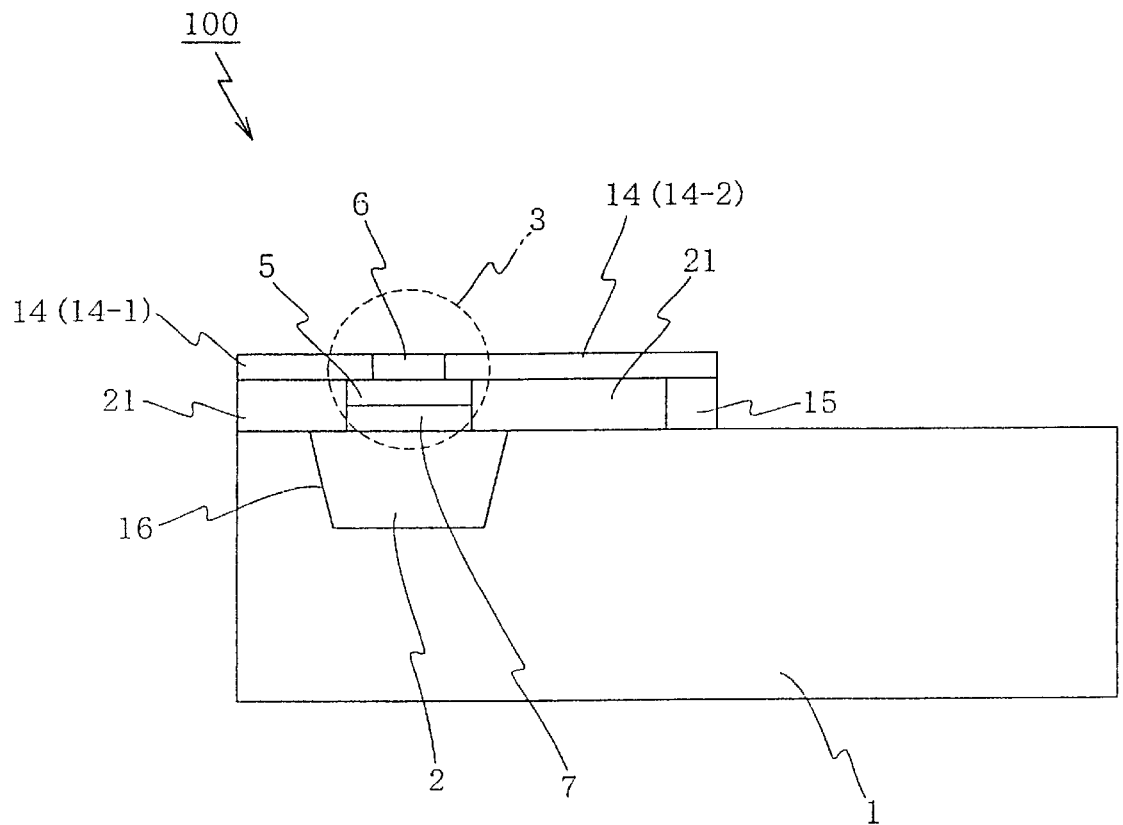
FIG. 14A is a cross sectional view of a specific example of the information reproduction head apparatus according to a second embodiment of the present invention.

FIG. 14 is a cross sectional view of a specific example of the information reproduction head apparatus 100 including a substrate 1 on which a magnetic sensor block 3 is provided via a non-magnetic insulation layer 2. The magnetic sensor block 3 is connected to a yoke block 14. That is, the information reproduction head apparatus 100 is a yoke type information reproduction head 100 wherein the magnetic sensor block 3 is constituted by a ferromagnetic tunnel junction element 5 sandwiched by an upper electrode block 6 and a lower electrode block 7. The tunnel junction element 5 is sandwiched by a front yoke block 14-1 adjacent to the medium 53 and a rear yoke block 14-2. At least a part of the front yoke block 14-1 and at least a part of the lower electrode 7 oppose to each other via the tunnel junction element 5. That is, in this embodiment, it is preferable that the tunnel junction element 5 be partially sandwiched by a part of the front yoke block 14-1 and a part of the lower electrode 7.

Figure 15:
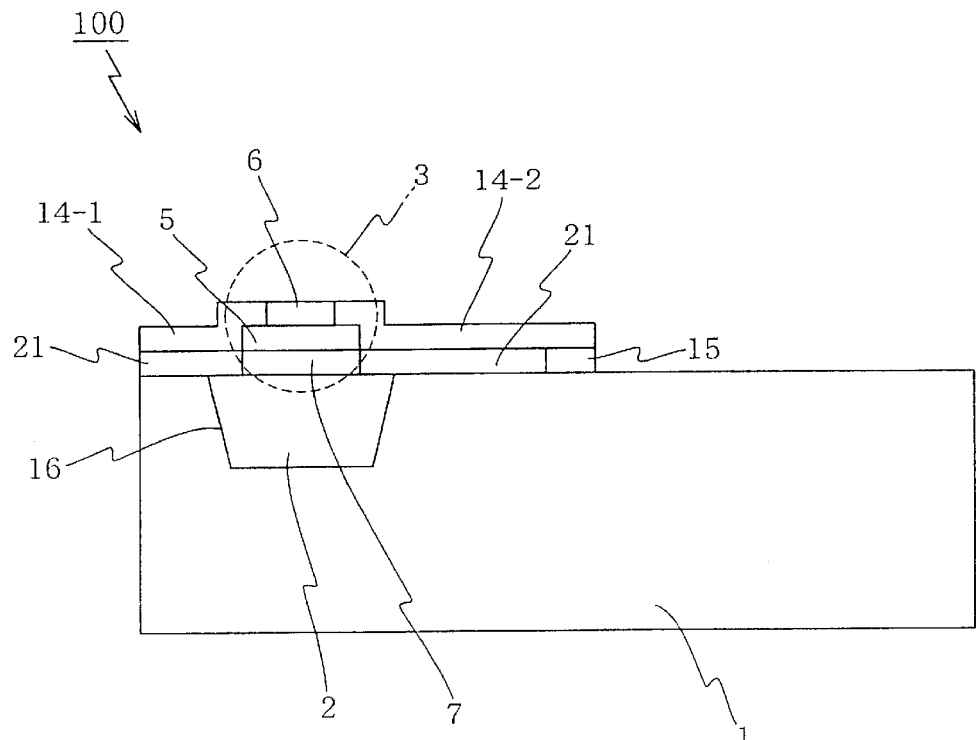
FIG. 15 is a cross sectional view of another specific example of the information reproduction head apparatus according to the second embodiment of the present invention.
Figure 16:
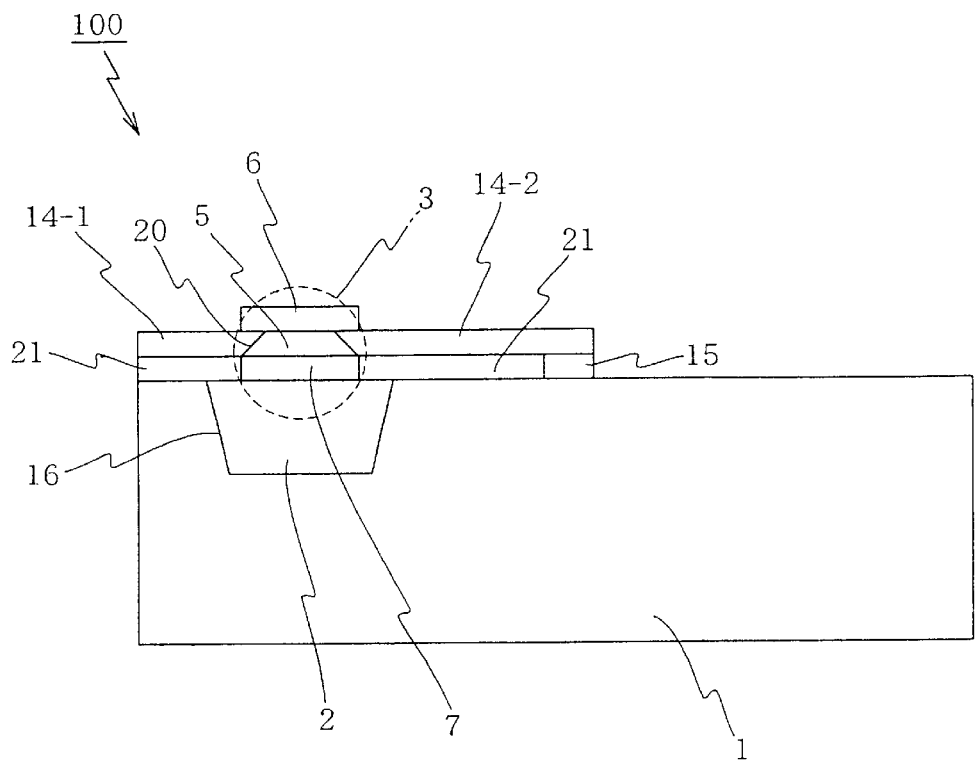
FIG. 16 is a cross sectional view of yet another specific example of the information reproduction head apparatus according to the second embodiment of the present invention.

On the other hand, as shown in FIG. 16, the junction surface 20 between the front yoke block 14-1 and the tunnel junction element 5 be tapered. Moreover, as shown in FIG. 15, the front yoke block 14-1 have a stepped configuration so as to be engaged with the tunnel junction element 5.

Furthermore, in this embodiment, it is preferable that the magnetic domain control bias layer 8 be provided in the direction orthogonally intersecting the yoke block 14.

According to the present invention, the information recording/reproducing system 200 includes: a magnetic recording medium; a magnetic recording apparatus for recording an information item on the recording medium; the aforementioned information reproduction head apparatus 100; and actuator means (not depicted) connected to the magnetic recording apparatus and the information reproduction head apparatus 100 for moving the magnetic recording apparatus and the information reproduction head 100 toward a selected track of the magnetic recording medium 53.

Hereafter, a detailed explanation will be given on the configuration of the information reproduction head apparatus 100 with reference to FIG. 14 to FIG. 17. In each of these example, a part of the tunnel junction element 5 is sandwiched by at least a part of the front yoke block 14-1 and at least a part of the lower electrode 7.

The ferromagnetic substrate 1 (made from NiZn ferrite, Mnzn ferrite, MgZn ferrite or the like) has a groove 16. This groove 16 is filled with a non-magnetic insulator 2 (made from Al oxide, Si oxide, aluminum nitride, silicone nitride, diamond-like carbon or the like) This non-magnetic insulator 2 is covered with a non-magnetic insulation layer 21, a magnetoresistance effect element 5, upper and lower electrodes 6 and 7, and yoke block 14.

Figure 18:
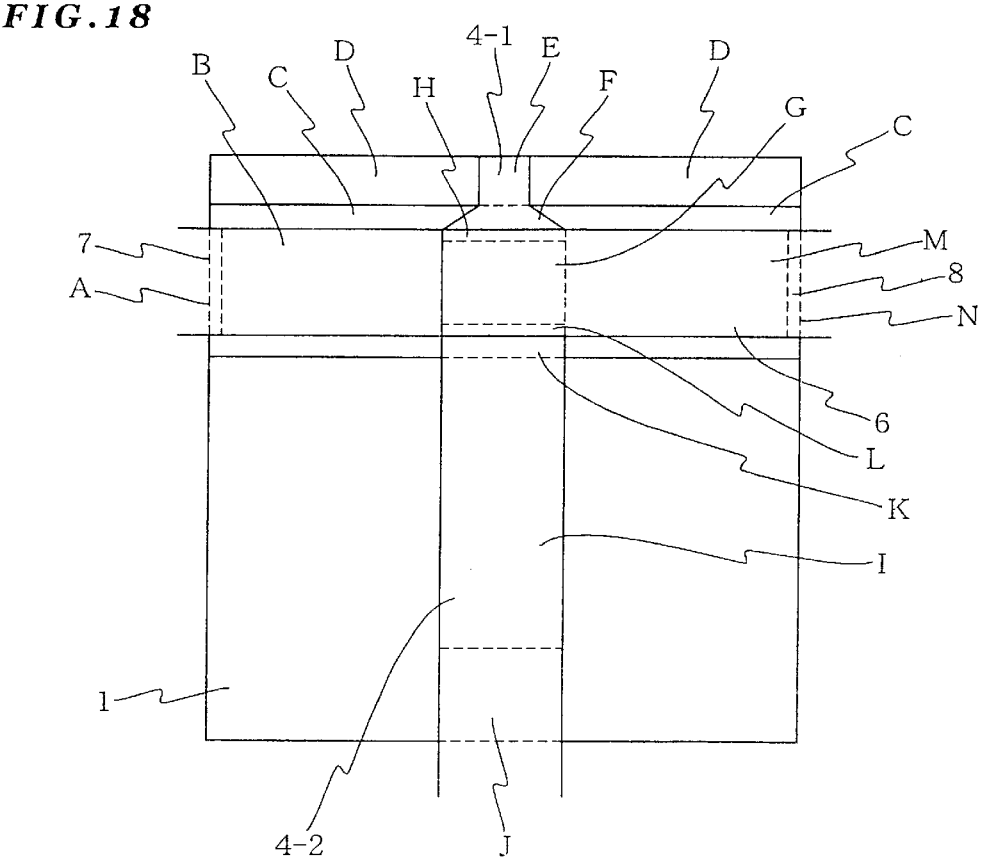
FIG. 18 is a plan view of a configuration example of the information reproduction head apparatus according to the second embodiment of the present invention.

Referring to FIG. 18, film configuration of points A to N are as follows.

A. ferromagnetic substrate, non-magnetic insulator, lower electrode layer

B. ferromagnetic substrate, non-magnetic insulator, lower electrode layer, magnetic domain control longitudinal bias layer C. ferromagnetic substrate, non-magnetic insulator D. ferromagnetic substrate E. ferromagnetic substrate, non-magnetic insulation layer, front yoke layer F. ferromagnetic substrate, non-magnetic insulator, non-magnetic insulation layer, front yoke layer G. ferromagnetic substrate, non-magnetic insulation layer, lower electrode layer, ferromagnetic tunnel junction element, upper electrode layer H. ferromagnetic substrate, non-magnetic insulation layer, lower electrode layer, ferromagnetic tunnel junction element, front yoke layer
I. ferromagnetic substrate, non-magnetic insulation layer, rear yoke layer
J. ferromagnetic substrate, soft magnetic layer, rear yoke layer
K. ferromagnetic substrate, non-magnetic insulator, non-magnetic insulation layer, rear yoke layer
L. feerromagnetic substrate, non-magnetic insulator, lower electrode film, ferromagnetic tunnel junction element, rear yoke layer
M. ferromagnetic substrate, non-magnetic insulator, film thickness regulating layer, magnetic domain longitudinal bias layer, upper electrode layer
N. ferromagnetic substrate, non-magnetic insulator, film thickness regulating layer, upper electrode layer Moreover, the respective film layers are preferably formed using the following materials.

1. Ferromagnetic substrate: NiZn ferrite, MnZn ferrite, Mgzn ferrite.
2. Non-magnetic insulator: Al oxide, Si oxide, aluminum nitride, silicon nitride, diamond-like carbon.
3. Magnetic domain control longitudinal bias layer: CoCrPt, CoCr, CoPt, CoCrTa, FeMn, NiMn, Ni oxide, NiCooxide, IrMn, PtPdMn, ReMn, PtPn.
4. Yokke layer and soft magnetic layer: NiFe, CoZr, orCoFeB, CoZrMo, CoZrNb, CoZr, CozrTa, CoHf, CoTa, CoTaHf, CoNbHf, CozrNb, CoHfPd, CoTaZrNb, CoZrMoNi alloy, FeAlSi, iron nitride, MnZn ferrite, NiZn ferrite, MgZn ferrite.
5. Lower electrode film and upper electrode film: Au, Ag, Cu, Mo, W, Ti.
6. Film thickness regulating layer (layer inserted for adjusting the position of the magnetic poles): Al oxide, si oxide, aluminum nitride, silicon nitride, diamond-like carbon.

As has been described above, the longitudinal bias layer 8 according to the present embodiment may be arranged as shown in FIG. 3 through FIG. 5, in the same way as the first embodiment.

Figure 14B:
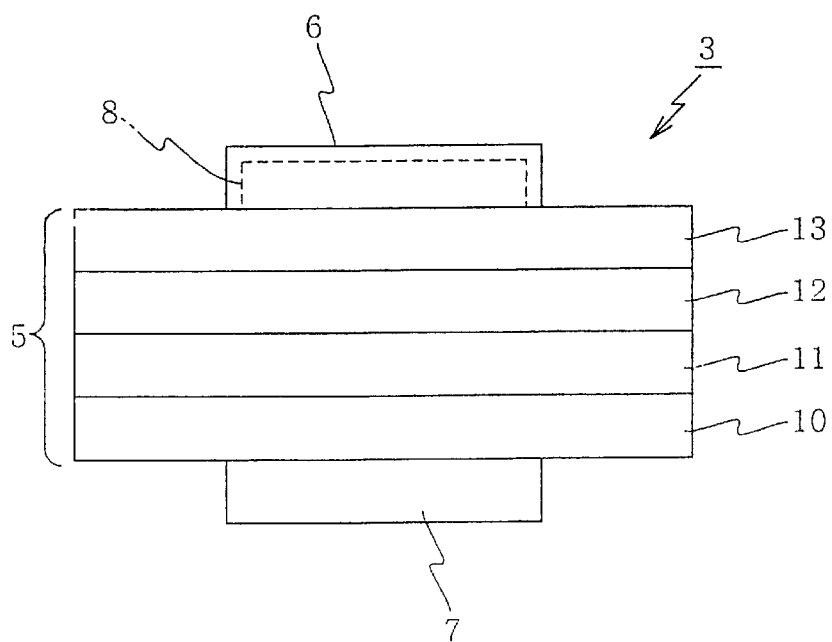
FIG. 14B is an enlarged view of a magnetic sensor block.

The ferromagnetic tunnel junction element used in the present embodiment may be as shown in FIG. 14B or such explained in the first embodiment.

It should be noted that in the magnetic sensor 3 of this information reproduction head apparatus 100, the fixing layer of the tunnel junction element 5 has a function to fix the magnetization direction of the fixed magnetic layer 11 and is contained as a part of the fixed magnetic layer 11 in FIG. 14B. Moreover, the tunnel junction element 5 according to the present embodiment may have aforementioned respective layers on the substrate arranged in the order as shown in FIG. 14 or in the reversed order. In this embodiment, by forming a write-in head block, the yoke type element 5 can be made into a recording/reproducing unitary head, i.e., an information recording/reproducing system 200.

FIG. 6 and FIG. 7 are perspective views of the information recording/reproducing system 200 according to the present embodiment.

Hereinafter, a detailed explanation will be given on the information reproduction head apparatus 100 according to the present embodiment.

That is, we prepared yoke type elements as shown in FIG. 14 to FIG. 17.

The tunnel junction film was prepared by Ta (3 nm), $Pt_{46}Mn_{54}$ (25 nm), $Co_{90}Fe_{10}$ (5 nm), aluminum oxide (2 nm), $Co_{90}Fe_{10}$ (2 nm) $Ni_{82}Fe_{18}$ (8 nm), and Ta (3 nm)

After film formation, a thermal treatment was performed at 250 degrees C. for five hours in a direction vertical to the magnetic field of film formation, while applying magnetic field of 500 Oe. The longitudinal bias made from 500 nm of CoCrTa was arranged as in FIG. 3.

Figure 19:
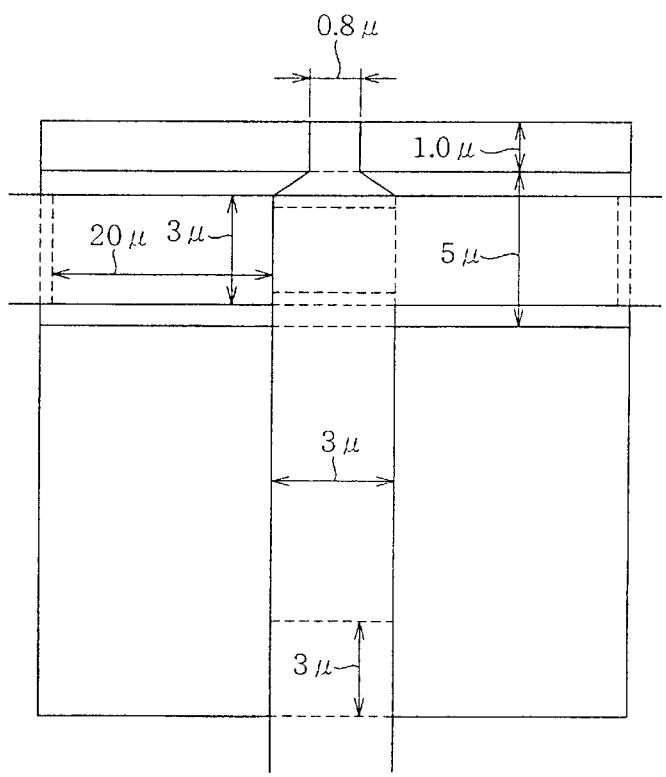
FIG. 19 is a plan view of a configuration example of the information reproduction head apparatus according to the second embodiment of the present invention with dimensions indicated.

The components constituting the reproduction head had dimensions shown in FIG. 19. The ferromagnetic substrate was made from MnZn ferrite. The front yoke and the rear yoke were formed by alternately forming a layer of Ta (5 nm) and $Ni_{80}Fe_{20}$ (20 nm) to obtain a total film thickness of 200 nm.

The non-magnetic insulator was made from Si oxide. The lower electrode was made from Au (50 nm) sandwiched by Mo (5 nm). The soft magnetic layer was prepared from $Ni_{80}Fe_{20}$, and the film thickness regulating layer was made from Zl oxide.

This head was made into a recording/reproducing unitary head with a slider as shown in FIG. 6. and a data was recorded and reproduced to/from a CoCrTa medium.

Here, the write-in track width was set to 1.5 micrometers; the write-in gap was set to 0.2 micrometers; and the read-in width was set to 0.7 micrometers. The coil portion of the write-in head was prepared by the photoresist hardening step at 250 degrees C. for 2 hours.

This step rotated the magnetization direction of the fixed magnetic layer which should be orientated in the element height direction and the magnetization of the fixing layer, disabling to operate as a magnetoresistance element. For this, after preparing the reproduction head block and the recording head block, one-hour magnetization thermal treatment was performed at 200 degrees C., in the magnetic field of 500 Oe.

From the magnetization curve, almost no rotation of the magnetization axis of the free magnetic layer was observed. The coercive force of the medium was 2.8 kOe. The head thus prepared was used to check the reproduction output, S/N, the mark length (frequency) reducing the reproduction output by half, and the bit error rate.

Check results were preferable as follows.

In case of FIG. 14: reproduction output was 2.9 mV; mark length reducing the reproduction output by half was 210 kFCI, S/N was 34 dB, and the bit error rate was $1\times10^{-6}$ or less.

In case of FIG. 15: reproduction output was 3.2 mV; mark length reducing the reproduction output by half was 267 kFCI, S/N was 35 dB, and the bit error rate was $1\times10^{-6}$ or less.

In case of FIG. 16: reproduction output was 3.3 mV; mark length reducing the reproduction output by half was 254 kFCI, S/N was 37 dB, and the bit error rate was $1\times10^{-6}$ or less.

Figure 17:
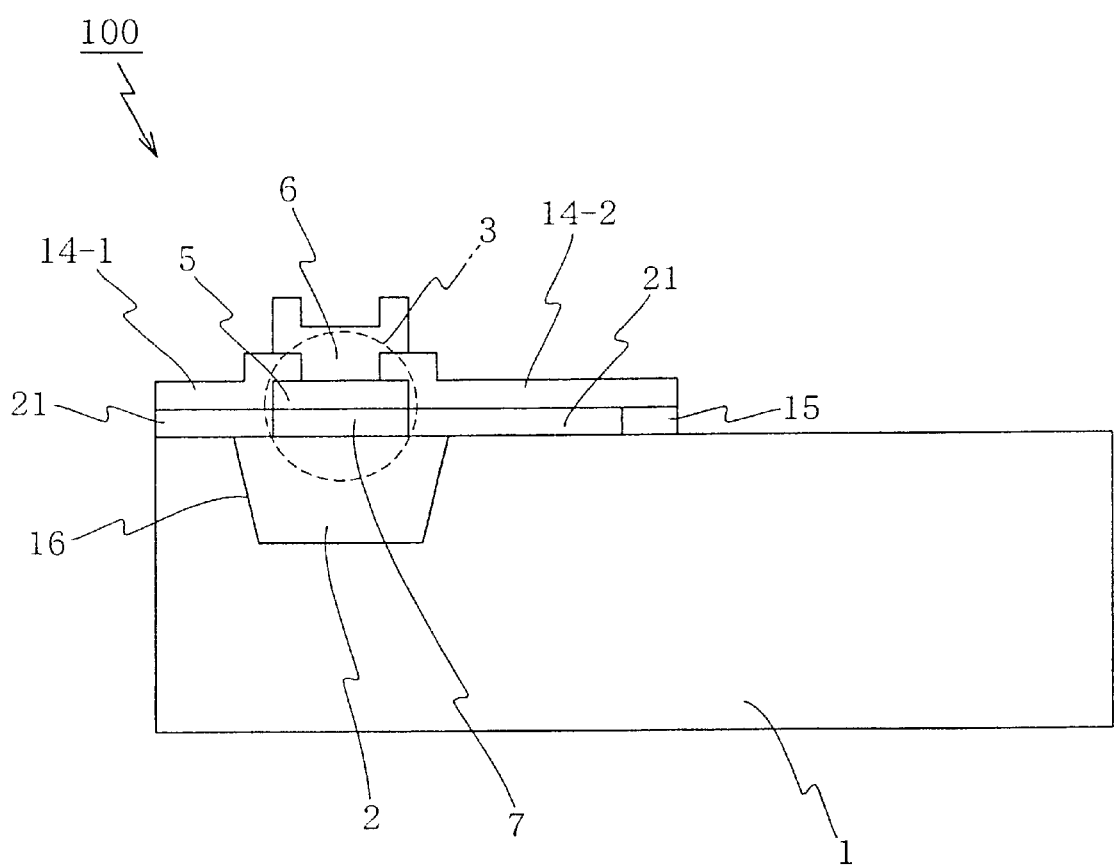
FIG. 17 is a cross sectional view of yet still another specific example of the information reproduction head apparatus according to the second embodiment of the present invention.

In case of FIG. 17: reproduction output was 3.4 mV; mark length reducing the reproduction output by half was 259 kFCI, S/N was 37 dB, and the bit error rate was $1\times10^{-6}$ or less.

The information reproduction head apparatus and the information recording/reproducing system according to the first embodiment having the aforementioned configuration can reduce the reproduction waveform noise more than the conventional apparatus and enables to obtain a preferable S/N and a preferable bit rate.

The information reproduction head apparatus and the information recording/reproducing system according to the second embodiment having the aforementioned configuration wherein the front yoke and the lower electrode are located not to interfere each other. Thus, it is possible to realize a yoke type magnetoresistance effect element assuring both of the front yoke magnetic path and the lower electrode electric path.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application (unexamined) No. 10-247093 (Filed on Sep. 1, 1998) and Japanese Patent Application (unexamined) No. 10-247095 (Filed on Sep. 1, 1998) including specification, claims, drawings and summary are incorporated herein by reference in its entirety.

What is claimed is:

1. A yoke type information reproduction head apparatus comprising a magnetic sensor block placed on a non-magnetic insulation layer provided on a substrate, the magnetic sensor being connected to a magnetic pole and including a ferromagnetic tunnel junction element sandwiched by an upper electrode block and a lower electrode block, wherein the tunnel junction element is in direct contact with a magnetic domain control bias layer.

2. A yoke type information reproduction head apparatus as claimed in claim 1, wherein the bias layer is in direct contact with a free magnetic layer constituting the tunnel junction element.

3. A yoke type information reproduction head apparatus as claimed claim 2, wherein the bias layer is at least partially overlaid on the free magnetic layer.

4. A yoke type information reproduction head apparatus as claimed claim 2, wherein the bias layer has a rectangular shape and at least part of the rectangular shape is in direct contact with the end portion of the free magnetic layer.

5. A yoke type information reproduction head apparatus as claimed claim 2, wherein the bias layer is arranged in a direction vertically intersecting the magnetic pole.

6. A yoke type information reproduction head apparatus as claimed claim 1, wherein the bias layer is at least partially overlaid on a free magnetic layer.

7. A yoke type information reproduction head apparatus as claimed claim 1, wherein the bias layer has a rectangular shape and at least part of the rectangular shape is in direct contact with the end portion of a free magnetic layer.

8. A yoke type information reproduction head apparatus as claimed claim 1, wherein the bias layer is arranged in a direction vertically intersecting the magnetic pole.

9. A yoke type information reproduction head apparatus as claimed in claim 1, wherein the non-magnetic insulation layer is buried in the substrate.

10. A yoke type information reproduction head apparatus as claimed in claim 1, wherein the magnetic pole is connected to a t least one of the upper electrode block and the lower electrode block connected to the tunnel junction element.

11. A yoke type information reproduction head apparatus as claimed in claim 10, wherein the magnetic pole is constituted by a first magnetic pole and a second magnetic pole located oppositely with respect to the tunnel junction element and the first magnetic pole is arranged at the side where a medium is present.

12. A yoke type information reproduction head apparatus as claimed in claim 1, wherein the bias layer is made from one of a ferromagnetic material and a hard magnetic material.

13. An information recording reproduction system comprising:

a magnetic storage medium having a plurality of tracks for recording information;

a magnetic recording apparatus for storing the information onto the magnetic storage medium;

the information reproduction head apparatus comprising a magnetic sensor block placed on a non-magnetic insulation layer provided on a substrate, the magnetic sensor being connected to a magnetic pole and including a ferromagnetic tunnel junction element sandwiched by an upper electrode block and a lower electrode block, wherein the tunnel junction element is in direct contact with a magnetic domain control bias layer; and an actuator connected to the magnetic recording apparatus and to the information reproduction head apparatus, for moving the magnetic recording apparatus and the information reproduction head to a selected one of tracks of the magnetic recording medium.

* * * * *